(12) United States Patent
Watanabe

(10) Patent No.: US 11,091,096 B2
(45) Date of Patent: Aug. 17, 2021

(54) PERIPHERY MONITORING DEVICE

(71) Applicant: AISIN SEIKI KABUSHIKI KAISHA, Kariya (JP)

(72) Inventor: Kazuya Watanabe, Anjo (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/632,923

(22) PCT Filed: Mar. 5, 2018

(86) PCT No.: PCT/JP2018/008409
§ 371 (c)(1),
(2) Date: Jan. 22, 2020

(87) PCT Pub. No.: WO2019/035229
PCT Pub. Date: Feb. 21, 2019

(65) Prior Publication Data
US 2020/0156542 A1 May 21, 2020

(30) Foreign Application Priority Data

Aug. 14, 2017 (JP) .............................. JP2017-156633

(51) Int. Cl.
*B60R 1/00* (2006.01)
*B60W 50/14* (2020.01)
(Continued)

(52) U.S. Cl.
CPC ............. *B60R 1/002* (2013.01); *B60W 50/14* (2013.01); *G06T 15/20* (2013.01); *G06T 17/05* (2013.01);
(Continued)

(58) Field of Classification Search
CPC ..................................................... B60R 1/002
See application file for complete search history.

(56) References Cited

U.S. PATENT DOCUMENTS

| | | | |
|---|---|---|---|
| 2012/0068840 A1* | 3/2012 | Ozaki | .................... G08G 1/168 340/456 |
| 2012/0069188 A1 | 3/2012 | Ohno et al. | |

(Continued)

FOREIGN PATENT DOCUMENTS

| | | |
|---|---|---|
| JP | 2010-274814 A | 12/2010 |
| JP | 2012-025327 A | 9/2013 |

(Continued)

OTHER PUBLICATIONS

International Search Report of PCT/JP2018/008409 dated May 22, 2018 [PCT/ISA/210].

*Primary Examiner* — Girumsew Wendmagegn
(74) *Attorney, Agent, or Firm* — Sughrue Mion, PLLC

(57) ABSTRACT

A periphery monitoring device according to an embodiment includes, as an example, a processor that generates a display image obtained by viewing, from a virtual viewpoint, a point of gaze in a virtual space including a model obtained by pasting a captured image obtained by imaging a surrounding area of a vehicle using an imaging unit provided on the vehicle to a three-dimensional plane around the vehicle, and including a three-dimensional vehicle image; and outputs the display image to a display. The processor changes a height of the virtual viewpoint in conjunction with a movement including a directional component in a vehicle width direction of the vehicle image when an instruction is made through an operation input unit to move the virtual viewpoint.

8 Claims, 12 Drawing Sheets

(51) Int. Cl.
*G06T 15/20* (2011.01)
*G06T 17/05* (2011.01)
*G08G 1/16* (2006.01)

(52) U.S. Cl.
CPC ........ *G08G 1/167* (2013.01); *B60R 2300/802* (2013.01); *B60R 2300/8086* (2013.01); *B60W 2050/146* (2013.01)

(56) References Cited

U.S. PATENT DOCUMENTS

2015/0262488 A1    9/2015  Ohno et al.
2018/0286095 A1*  10/2018  Kusayanagi ............ G06T 11/60

FOREIGN PATENT DOCUMENTS

| | | | |
|---|---|---|---|
| JP | 2013-191969 A | | 9/2013 |
| JP | 2013191969 A | * | 9/2013 |
| JP | 5658507 B2 | | 1/2015 |
| JP | 2016-213841 A | | 12/2016 |
| WO | 2017061230 A1 | | 4/2017 |

* cited by examiner

PERIPHERY MONITORING DEVICE

CROSS-REFERENCE TO RELATED APPLICATIONS

This application is national stage application of International Application No. PCT/JP2018/008409, filed Mar. 5, 2018, which designates the United States, incorporated herein by reference, and which claims the benefit of priority from Japanese Patent Application No. 2017-156633, filed Aug. 14, 2017, the entire contents of which are incorporated herein by reference.

TECHNICAL FIELD

Embodiments of the present invention relate to a periphery monitoring device.

BACKGROUND ART

Techniques have been developed in which, when a virtual viewpoint image around a vehicle viewed from a virtual viewpoint is displayed based on a captured image obtained by imaging an area around the vehicle using imaging units, a line-of-sight direction from the virtual viewpoint is continuously changed.

CITATION LIST

Patent Literature

Patent Document 1: Japanese Laid-open Patent Publication No. 2016-213841

SUMMARY OF INVENTION

Problem to be Solved by the Invention

However, in the techniques of continuously changing the line-of-sight direction from the virtual viewpoint, the virtual viewpoint image around the vehicle viewed from the virtual viewpoint fixed in the vehicle is displayed. Therefore, an objective positional relation between the vehicle and an obstacle is difficult to be recognized, making it difficult to use the virtual viewpoint image to know whether the vehicle will contact the obstacle when the vehicle is passing through, for example, a narrow road.

Means for Solving Problem

A periphery monitoring device of an embodiment includes, for example: a processor configured to generate a display image obtained by viewing, from a virtual viewpoint, a point of gaze in a virtual space including a model obtained by pasting a captured image obtained by imaging a surrounding area of a vehicle using an imaging unit provided on the vehicle to a three-dimensional plane around the vehicle, and including a three-dimensional vehicle image; and output the display image to a display, wherein the processor changes a height of the virtual viewpoint in conjunction with a movement including a directional component in a vehicle width direction of the vehicle image when an instruction is made through an operation input unit to move the virtual viewpoint. Accordingly, as an example, the periphery monitoring device according to the present embodiment can easily display the display image viewed from a viewpoint position desired by a passenger of the vehicle.

A periphery monitoring device of an embodiment includes, for example: a processor configured to generate a display image obtained by viewing, from a virtual viewpoint, a point of gaze in a virtual space including a model obtained by pasting a captured image obtained by imaging a surrounding area of a vehicle using an imaging unit provided on the vehicle to a three-dimensional plane around the vehicle, and including a three-dimensional vehicle image; and output the display image to a display. If an instruction is made through an operation input unit to move the virtual viewpoint in a certain direction, the processor moves the virtual viewpoint in a horizontal direction to a horizontal position corresponding to a horizontal component of the certain direction and in a height direction to a height corresponding to the horizontal position in the horizontal direction. Accordingly, as an example, the periphery monitoring device according to the present embodiment can easily display the display image viewed from the viewpoint position desired by the passenger of the vehicle.

A periphery monitoring device of an embodiment includes, for example: a processor configured to generate a display image obtained by viewing, from a virtual viewpoint, a point of gaze in a virtual space including a model obtained by pasting a captured image obtained by imaging a surrounding area of a vehicle using an imaging unit provided on the vehicle to a three-dimensional plane around the vehicle, and including a three-dimensional vehicle image; and output the display image to a display. If an instruction is made through the operation input unit to move the virtual viewpoint to a certain position on a preset trajectory in a horizontal direction, the processor changes a height of the virtual viewpoint in conjunction with the movement to the certain position. Accordingly, as an example, the periphery monitoring device according to the present embodiment can easily display the display image viewed from the viewpoint position desired by the passenger of the vehicle.

In the periphery monitoring device of the embodiments, wherein the processor reduces the height of the virtual viewpoint as the virtual viewpoint moves away from a center in a vehicle width direction of the vehicle image. Accordingly, as an example, the periphery monitoring device according to the present embodiment can easily display the display image viewed from the viewpoint position desired by the passenger of the vehicle.

In the periphery monitoring device of the embodiments, wherein the processor moves a position of the virtual viewpoint in a front-rear direction of the vehicle image in a traveling direction of the vehicle image as the virtual viewpoint moves away from a center in a vehicle width direction of the vehicle image. Accordingly, as an example, the periphery monitoring device according to the present embodiment can easily display the display image in a direction closer to a direction desired to be viewed by the passenger of the vehicle.

In the periphery monitoring device of the embodiments, wherein the processor sets transmittance of the vehicle image to first transmittance when the height of the virtual viewpoint is a first height, and sets the transmittance of the vehicle image to second transmittance lower than the first transmittance when the height of the virtual viewpoint is a second height lower than the first height. Accordingly, with the periphery monitoring device according to the present embodiment, as an example, a simple operation can display the display image that facilitates to check information for which the passenger of the vehicle has moved the virtual viewpoint.

In the periphery monitoring device of the embodiments, wherein the processor reduces a view angle of the display image as the virtual viewpoint moves away from a center in a vehicle width direction of the vehicle image. Accordingly, as an example, the periphery monitoring device according to the present embodiment can easily display the display image having the view angle at which the passenger of the vehicle desires to view.

In the periphery monitoring device of the embodiments, wherein the processor matches a position of the virtual viewpoint in a vehicle width direction of the vehicle image with a position of the point of gaze in the vehicle width direction of the vehicle image. Accordingly, with the periphery monitoring device according to the present embodiment, as an example, when the passenger of the vehicle wants to avoid contact of the vehicle with an obstacle present on a lateral side of the vehicle, the passenger can display the desired display image with a smaller number of operations.

BRIEF DESCRIPTION OF DRAWINGS

FIG. 1 is a perspective view illustrating an example of a state in which a part of a passenger compartment of a vehicle provided with a periphery monitoring device according to a first embodiment of the present invention is viewed through;

DESCRIPTION OF EMBODIMENTS

Exemplary embodiments of the present invention will be disclosed below. Configurations of the embodiments described below, and operations, results, and effects brought about by the configurations are merely exemplary. The present invention can be achieved by any configuration other than the configurations disclosed in the following embodiments, and can attain at least one of various types of effects and secondary effects based on the basic configurations.

A vehicle provided with a periphery monitoring device (periphery monitoring system) according to the embodiments may be an automobile (internal combustion engined automobile) using an internal combustion engine (engine) as a driving source, an automobile (such as an electric vehicle or a fuel cell vehicle) using an electric motor (motor) as a driving source, or an automobile (hybrid vehicle) using both the engine and the motor as driving sources. The vehicle can be provided with any of various types of transmissions, and various types of devices (such as systems and components) required for driving the internal combustion engine and/or the electric motor. For example, systems, numbers, and layouts of devices for driving wheels on the vehicle can be variously set.

First Embodiment

Figure 1:
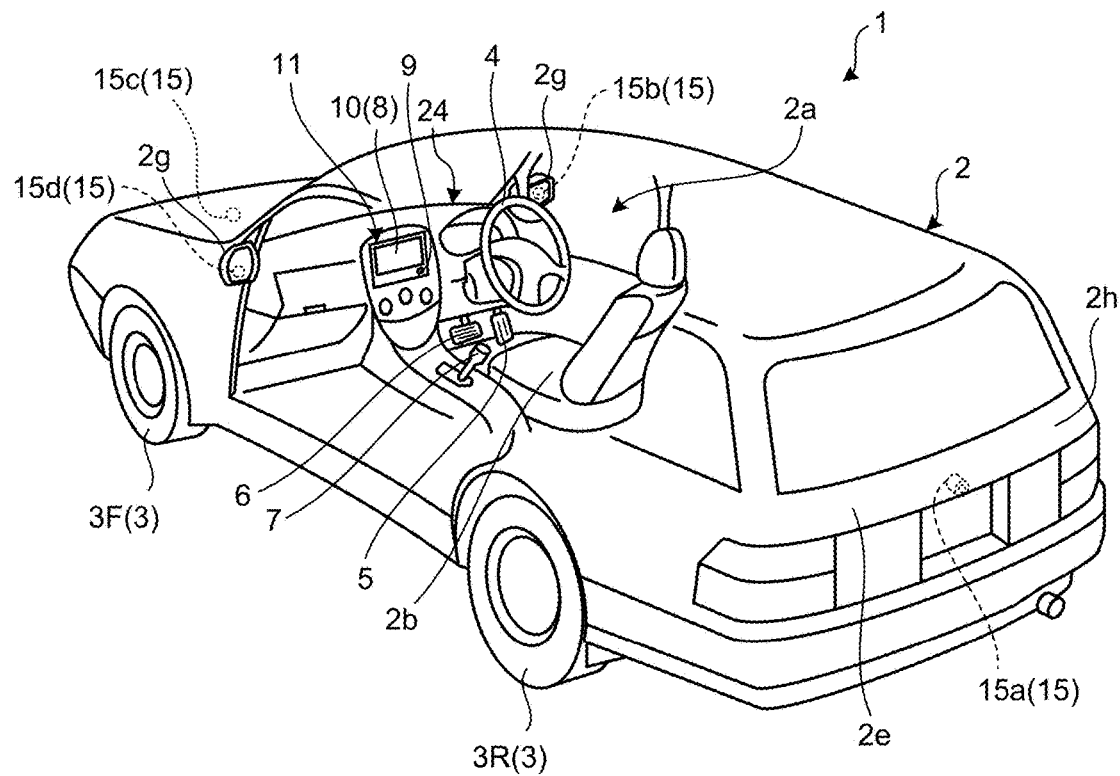

FIG. 1 is a perspective view illustrating an example of a state in which a part of a passenger compartment of the vehicle provided with the periphery monitoring device according to a first embodiment of the present invention is viewed through. As illustrated in FIG. 1, a vehicle 1 includes a vehicle body 2, a steering unit 4, an acceleration operation unit 5, a braking operation unit 6, a gear shift operation unit 7, and a monitor device 11. The vehicle body 2 includes a passenger compartment 2a in which a passenger rides. The passenger compartment 2a is provided therein with, for example, the steering unit 4, the acceleration operation unit 5, the braking operation unit 6, and the gear shift operation unit 7 in a state in which a driver as the passenger is seated in a seat 2b. The steering unit 4 is, for example, a steering wheel projecting from a dashboard 24. The acceleration operation unit 5 is, for example, an accelerator pedal located near a foot of the driver. The braking operation unit 6 is, for example, a brake pedal located near the foot of the driver. The gear shift operation unit 7 is, for example, a shift lever projecting from a center console.

The monitor device 11 is provided, for example, at a central part in a vehicle width direction (that is, a right-left direction) of the dashboard 24. The monitor device 11 may have a function of, for example, a navigation system or an audio system. The monitor device 11 includes a display 8, a voice output device 9, and an operation input unit 10. The monitor device 11 may include various types of operation input units, such as switches, dials, joysticks, and pushbuttons.

The display 8 is constituted by, for example, a liquid crystal display (LCD) or an organic electroluminescent display (OELD), and can display various images based on image data. The voice output device 9 is constituted by, for example, a speaker, and outputs various voices based on voice data. The voice output device 9 may be provided in a different position in the passenger compartment 2a other than the monitor device 11.

The operation input unit 10 is constituted by, for example, a touchscreen panel, and allows the passenger to enter various types of information. The operation input unit 10 is provided on a display screen of the display 8, and allows the images displayed on the display 8 to be viewed through. With this configuration, the operation input unit 10 allows the passenger to view the images displayed on the display screen of the display 8. The operation input unit 10 detects a touch operation of the passenger on the display screen of the display 8 to receive an input of each of the various types of information by the passenger.

Figure 2:
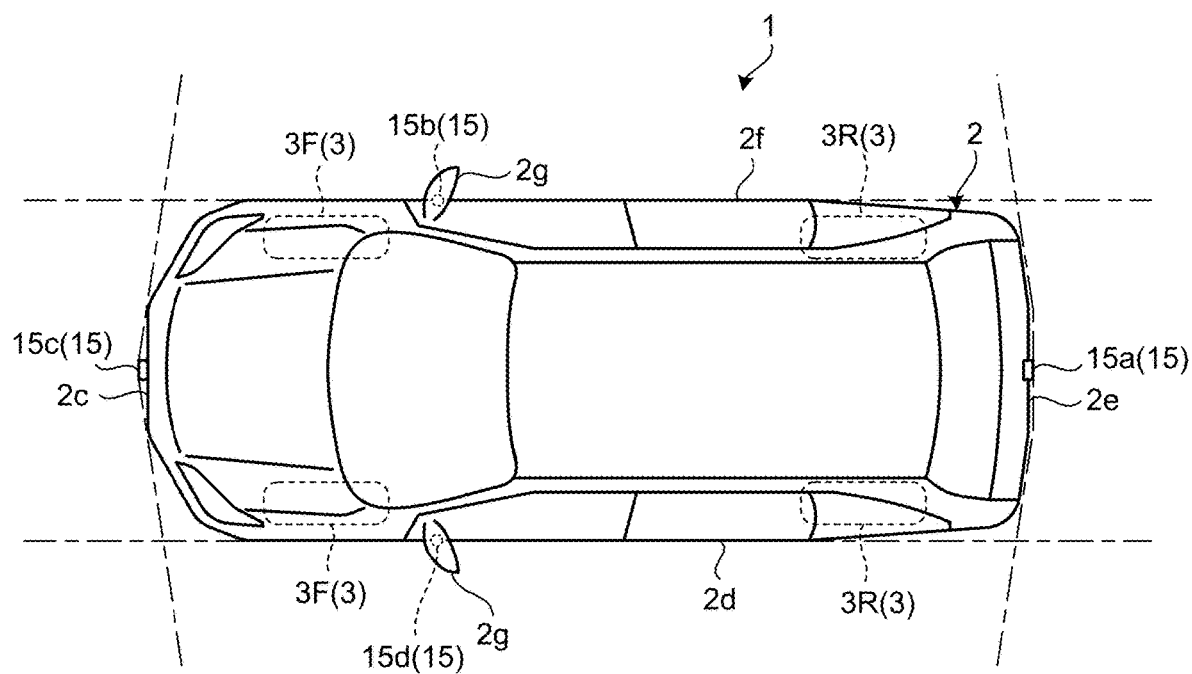
FIG. 2 is a plan view of an example of the vehicle according to the first embodiment.

FIG. 2 is a plan view of an example of the vehicle according to the first embodiment. As illustrated in FIGS. 1 and 2, the vehicle 1 is, for example, a four-wheeled automobile, and includes two right and left front wheels 3F and two right and left rear wheels 3R. All or some of the four wheels 3 are steerable.

The vehicle 1 is provided with a plurality of imaging units 15. In the present embodiment, the vehicle 1 is provided with, for example, four imaging units 15a to 15d. The imaging units 15 are digital cameras each having an image pickup device, such as a charge-coupled device (CCD) or a complementary metal-oxide-semiconductor (CMOS) image sensor (CIS). The imaging units 15 can image a surrounding area of the vehicle 1 at a predetermined frame rate. The imaging units 15 output a captured image obtained by imaging the surrounding area of the vehicle 1. Each of the imaging units 15 includes a wide-angle lens or a fish-eye lens, and can image a range of, for example, 140 degrees to 220 degrees in the horizontal direction. An optical axis of the imaging unit 15 may be set obliquely downward.

Specifically, the imaging unit 15a is located, for example, at a rear end 2e of the vehicle body 2, and is provided at a wall below a rear window of a rear hatch door 2h. The imaging unit 15a can image an area behind the vehicle 1 out of the surrounding area of the vehicle 1. The imaging unit 15b is located, for example, at a right end 2f of the vehicle body 2, and is provided at a right door mirror 2g. The imaging unit 15b can image an area on a side of the vehicle 1 out of the surrounding area of the vehicle 1. The imaging unit 15c is located, for example, on a front side of the vehicle body 2, that is, at a front end 2c in a front-rear direction of the vehicle 1, and is provided, for example, at a front bumper or a front grill. The imaging unit 15c can image an area in front of the vehicle 1 out of the surrounding area of the vehicle 1. The imaging unit 15d is located, for example, on a left side, that is, at a left end 2d in the vehicle width direction of the vehicle body 2, and is provided at a left door mirror 2g. The imaging unit 15d can image an area on a side of the vehicle 1 out of the surrounding area of the vehicle 1.

Figure 3:
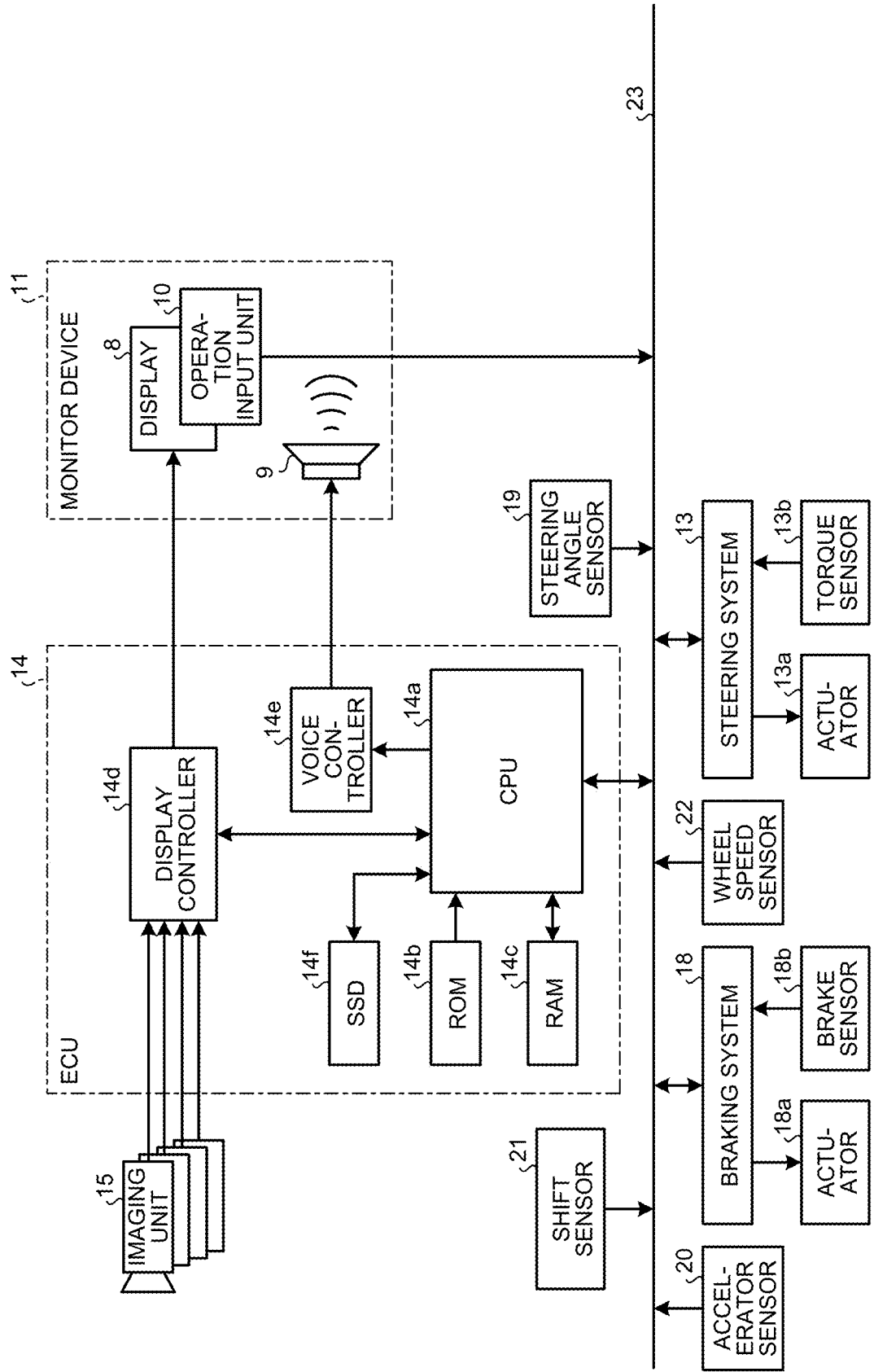
FIG. 3 is a block diagram illustrating an example of a functional configuration of the vehicle according to the first embodiment.

FIG. 3 is a block diagram illustrating an example of a functional configuration of the vehicle according to the first embodiment. As illustrated in FIG. 3, the vehicle 1 includes a steering system 13, a braking system 18, a steering angle sensor 19, an accelerator sensor 20, a shift sensor 21, wheel speed sensors 22, an in-vehicle network 23, and an electronic control unit (ECU) 14. The monitor device 11, the steering system 13, the braking system 18, the steering angle sensor 19, the accelerator sensor 20, the shift sensor 21, the wheel speed sensors 22, and the ECU 14 are electrically connected together through the in-vehicle network 23 serving as an electrical communication line. The in-vehicle network 23 is configured as, for example, a Controller Area Network (CAN).

The steering system 13 is, for example, an electric power steering system or a steer-by-wire (SBW) system. The steering system 13 includes an actuator 13a and a torque sensor 13b. The steering system 13 is electrically controlled by, for example, the ECU 14, and operates the actuator 13a to steer the wheels 3 by supplementing a steering force by adding torque to the steering unit 4. The torque sensor 13b detects torque applied to the steering unit 4 by the driver, and transmits the detection result to the ECU 14.

The braking system 18 includes an anti-lock braking system (ABS) that controls locking of brakes of the vehicle 1, an electronic stability control (ESC) that restrains sideslip of the vehicle 1 during cornering, an electric braking system that enhances braking forces to assist the brakes, and a brake-by-wire (BBW). The braking system 18 includes an actuator 18a and a brake sensor 18b. The braking system 18 is electrically controlled by, for example, the ECU 14, and applies the braking forces to the wheels 3 through the actuator 18a. The braking system 18 detects, for example, locking of a brake, free spin of any one of the wheels 3, or a sign of the sideslip based on, for example, a rotational difference between the right and left wheels 3, and performs control to restrain the locking of the brake, the free spin of the wheel 3, or the sideslip. The brake sensor 18b is a displacement sensor that detects a position of the brake pedal serving as a movable part of the braking operation unit 6, and transmits the detection result of the position of the brake pedal to the ECU 14.

The steering angle sensor 19 is a sensor that detects an amount of steering of the steering unit 4, such as the steering wheel. In the present embodiment, the steering angle sensor 19 that is constituted by, for example, a Hall element detects a rotational angle of a rotating part of the steering unit 4 as the amount of steering, and transmits the detection result to the ECU 14. The accelerator sensor 20 is a displacement sensor that detects a position of the accelerator pedal serving as a movable part of the acceleration operation unit 5, and transmits the detection result to the ECU 14.

The shift sensor 21 is a sensor that detects a position of a movable part (for example, a bar, an arm, or a button) of the gear shift operation unit 7, and transmits the detection result to the ECU 14. The wheel speed sensors 22 are sensors that each include, for example, a Hall element, and detect amounts of rotation of the wheels 3 or numbers of rotations of the wheels 3 per unit time, and transmit the detection results to the ECU 14.

The ECU 14 generates an image obtained by viewing a point of gaze in the surrounding area of the vehicle 1 from a virtual viewpoint based on the captured image obtained by imaging the surrounding area of the vehicle 1 using the imaging units 15, and displays the generated image on the display 8. The ECU 14 is constituted by, for example, a computer, and is in charge of overall control of the vehicle 1 through cooperation between hardware and software. Specifically, the ECU 14 includes a central processing unit (CPU) 14a, a read-only memory (ROM) 14b, a random access memory (RAM) 14c, a display controller 14d, a voice controller 14e, and a solid-state drive (SSD) 14f. The CPU 14a, the ROM 14b, and the RAM 14c may be provided on the same circuit board.

The CPU 14a reads a computer program stored in a nonvolatile storage device, such as the ROM 14b, and executes various types of arithmetic processing according to the computer program. The CPU 14a executes, for example, image processing on image data to be displayed on the display 8, and calculation of a distance to an obstacle present in the surrounding area of the vehicle 1.

The ROM 14b stores therein various computer programs and parameters required for executing the computer programs. The RAM 14c temporarily stores therein various types of data used in the arithmetic processing by the CPU 14a. The display controller 14d mainly executes, among the arithmetic processing operations in the ECU 14, for example, image processing on image data acquired from the imaging units 15 and to be output to the CPU 14a, and conversion of image data acquired from the CPU 14a into display image data to be displayed on the display 8. The voice controller 14e mainly executes, among the arithmetic processing operations in the ECU 14, processing of a voice acquired from the CPU 14a and to be output to the voice output device 9. The SSD 14f is a rewritable nonvolatile storage device, and keeps storing data acquired from the CPU 14a even after power supply to the ECU 14 is turned off.

Figure 4:
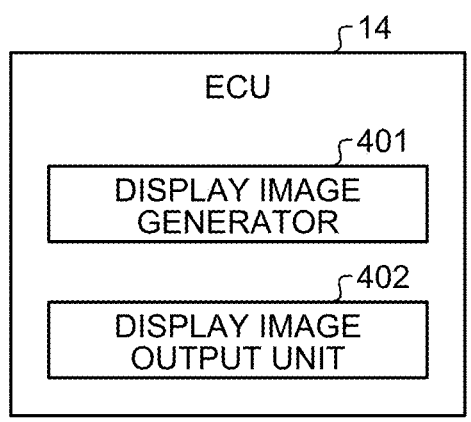
FIG. 4 is a block diagram illustrating an example of a functional configuration of an electronic control unit (ECU) included in the vehicle according to the first embodiment.

FIG. 4 is a block diagram illustrating an example of a functional configuration of the ECU included in the vehicle according to the first embodiment. As illustrated in FIG. 4, the ECU 14 includes a display image generator 401 and a display image output unit 402. For example, a processor, such as the CPU 14a mounted on the circuit board, executes a computer program for periphery monitoring stored in a storage medium, such as the ROM 14b or the SSD 14f, and thus, the ECU 14 performs functions of the display image generator 401 and the display image output unit 402. A part or the whole of the display image generator 401 and the display image output unit 402 may be configured as hardware, such as a circuit.

The display image generator 401 acquires, from the imaging units 15, the captured image obtained by imaging the surrounding area of the vehicle 1 using the imaging units 15. In the present embodiment, the display image generator 401 acquires the captured image obtained by imaging the surrounding area of the vehicle 1 in a position (hereinafter, called "past position") of the vehicle 1 at a certain time (hereinafter, called "past time") using the imaging units 15. Then, the display image generator 401 generates, based on the acquired captured image, the display image visualizing a positional relation between the vehicle 1 and the obstacle present in the surrounding area of the vehicle 1.

Specifically, based on the acquired captured image, the display image generator 401 generates, as the display image, the image obtained by viewing the point of gaze in a virtual space obtained by providing a three-dimensional vehicle image in a space around the vehicle 1 from the virtual viewpoint received through the operation input unit 10. The virtual space is a space around the vehicle 1, and is a space in which the vehicle image is provided in a position (for example, the current position) of the vehicle 1 at a time (for example, the current time) after the past time. The vehicle image is a three-dimensional image of the vehicle 1 allowing viewing therethrough the virtual space.

In the present embodiment, the display image generator 401 pastes the acquired captured image to a three-dimensional plane (hereinafter, called "camera picture model") around the vehicle 1 to generate a space including the camera picture model as a space around the vehicle 1. Then, the display image generator 401 generates, as the virtual space, a space in which the vehicle image is disposed corresponding to the current position of the vehicle 1 in the generated space. Thereafter, the display image generator 401 generates, as the display image, an image obtained by viewing the point of gaze in the generated virtual space from the virtual viewpoint received through the operation input unit 10.

At that time, if an instruction is made through the operation input unit 10 to move the virtual viewpoint in the vehicle width direction of the vehicle image, the display image generator 401 changes the height of the virtual viewpoint in conjunction with the movement of the virtual viewpoint in the vehicle width direction of the vehicle image. In other words, the display image generator 401 changes a position of the virtual viewpoint in an up-down direction of the vehicle image in conjunction with the movement of the virtual viewpoint in the vehicle width direction of the vehicle image. Specifically, the display image generator 401 reduces the height of the virtual viewpoint as the virtual viewpoint moves away from the center in the vehicle width direction of the vehicle image. The display image output unit 402 outputs the display image generated by the display image generator 401 to the display 8.

This operation can also change the height of the virtual viewpoint so as to display the display image viewed from a viewpoint position desired by the passenger of the vehicle 1 by simply moving the virtual viewpoint in the vehicle width direction of the vehicle image, so that the display image viewed from the viewpoint position desired by the passenger of the vehicle 1 can be easily displayed. In the present embodiment, if the instruction is made to move the virtual viewpoint, the display image generator 401 changes the height of the virtual viewpoint in conjunction with the movement of the virtual viewpoint in the vehicle width direction of the vehicle image. However, the display image generator 401 is not limited to this example as long as the display image generator 401 changes the height of the virtual viewpoint in conjunction with a movement including a directional component in the vehicle width direction of the vehicle image if the instruction is made to move the virtual viewpoint. For example, the display image generator 401 changes the height of the virtual viewpoint in conjunction with a movement including the directional component in the vehicle width direction of the vehicle image and a directional component in the front-rear direction of the vehicle image.

In the present embodiment, the display image generator 401 reduces the height of the virtual viewpoint as the virtual viewpoint moves away from the center of the vehicle image in the vehicle width direction of the vehicle image, but only needs to reduce the height of the virtual viewpoint in conjunction with the movement of the virtual viewpoint in the vehicle width direction of the vehicle image. For example, the display image generator 401 may increase the height of the virtual viewpoint as the virtual viewpoint moves away from the center of the vehicle image in the vehicle width direction of the vehicle image, or may cyclically change the height of the virtual viewpoint according to a change in position of the virtual viewpoint in the vehicle width direction of the vehicle image. In the present embodiment, the display image generator 401 moves the virtual viewpoint outside the vehicle image. As a result, the display image generator 401 can prohibit the virtual viewpoint from moving into the vehicle image.

In the present embodiment, if an instruction is made through the operation input unit 10 to move the virtual viewpoint in the height direction (up-down direction of the vehicle image) in addition to moving the virtual viewpoint in the vehicle width direction of the vehicle image, the display image generator 401 can also move the virtual viewpoint to a height instructed through the operation input unit 10 in the height direction of the virtual viewpoint, in conjunction with the movement of the virtual viewpoint in the vehicle width direction of the vehicle image. Furthermore, while, in the present embodiment, if the instruction is made to move the virtual viewpoint in the vehicle width direction of the vehicle image, the display image generator 401 changes the height of the virtual viewpoint in conjunction with the movement of the virtual viewpoint in the vehicle width direction of the vehicle image, the display image generator 401 can also change the height of the virtual viewpoint in conjunction with the movement of the virtual viewpoint in the front-rear direction of the vehicle image if an instruction is made to move the virtual viewpoint in the front-rear direction.

Figure 5:
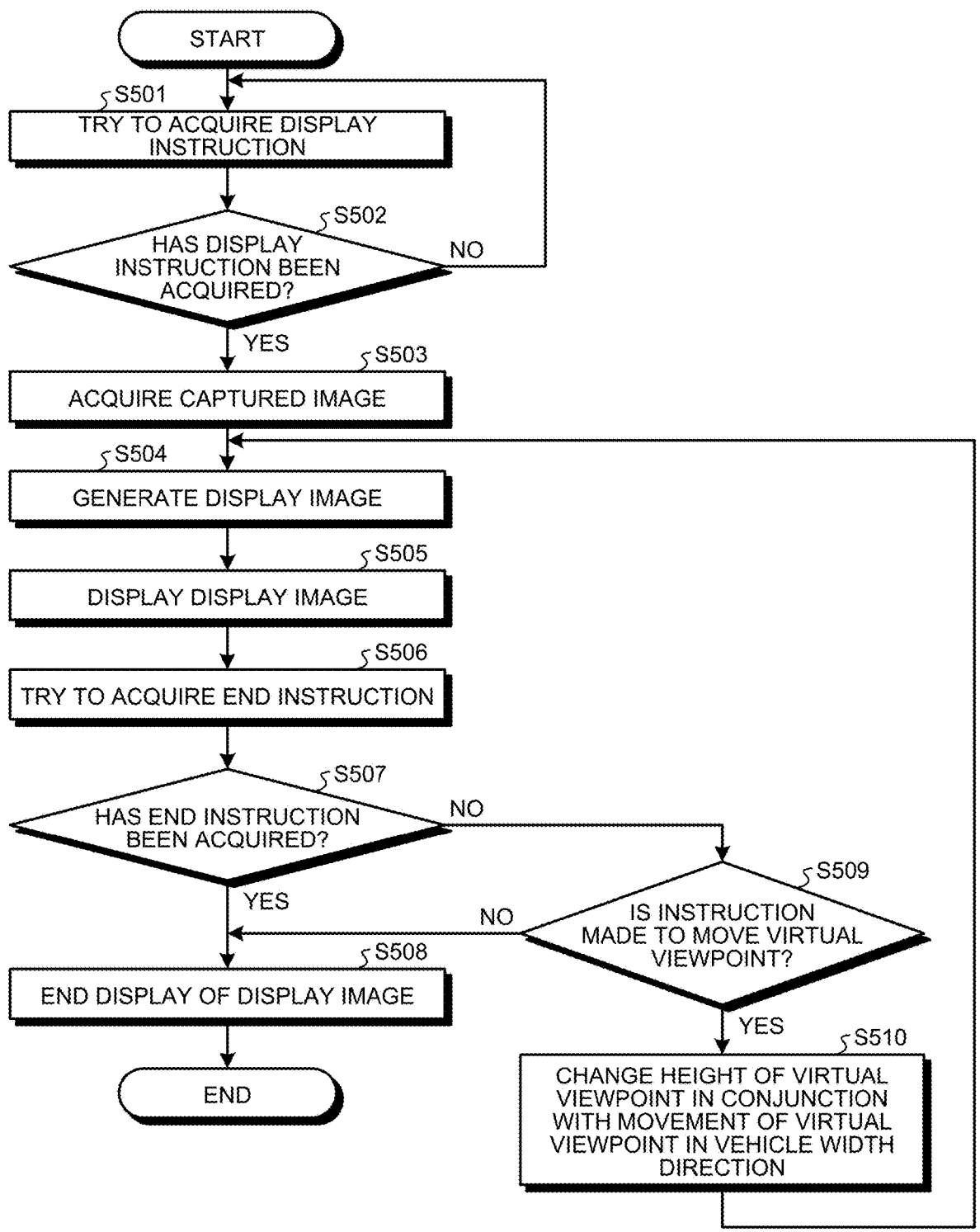
FIG. 5 is a flowchart illustrating an example of a flow of displaying processing of a display image performed by the vehicle according to the first embodiment.

The following describes an example of a flow of displaying processing of the display image performed by the vehicle 1 according to the present embodiment, with reference to FIG. 5. FIG. 5 is a flowchart illustrating the example of the flow of the displaying processing of the display image performed by the vehicle according to the first embodiment.

In the present embodiment, the display image generator 401 tries to acquire a display instruction for instructing to display a display image (Step S501). If the display instruction has been acquired (Yes at Step S502), the display image generator 401 acquires a captured image obtained by imaging the surrounding area of the vehicle 1 in the past position using the imaging units 15 (Step S503). For example, the display image generator 401 acquires the captured image obtained by imaging the surrounding area of the vehicle 1 using the imaging units 15 in a past position of the vehicle 1 at a past time earlier by a preset time (for example, several seconds) than the current time (or in a past position before the current position of the vehicle 1 by a preset distance (for example, 2 m)).

Then, the display image generator 401 generates, based on the acquired captured image, the display image obtained by viewing the point of gaze in the virtual space from the virtual viewpoint received through the operation input unit 10 (Step S504). In the present embodiment, the display image generator 401 generates the display image based on the captured image obtained by imaging the surrounding area of the vehicle 1 in the past position using the imaging units 15. However, the display image only needs to be generated based on a captured image obtained by imaging the surrounding area of the vehicle 1 using the imaging units 15. For example, the display image generator 401 may generate the display image based on the captured image obtained by imaging the surrounding area of the vehicle 1 in the current position using the imaging units 15.

The display image output unit 402 outputs the display image generated by the display image generator 401 to the display 8 to display the display image on the display 8 (Step S505). Thereafter, the display image generator 401 tries to acquire an end instruction for ending the display of the display image (Step S506). If the end instruction has been acquired (Yes at Step S507), the display image output unit 402 stops outputting the display image to the display 8, and ends the display of the display image on the display 8 (Step S508).

If, instead, the end instruction has not been acquired (No at Step S507), the display image generator 401 determines whether the instruction is made through the operation input unit 10 to move the virtual viewpoint in the vehicle width direction of the vehicle image (Step S509). If a preset time has elapsed while no instruction is made to move the virtual viewpoint in the vehicle width direction of the vehicle image (No at Step S509), the display image output unit 402 stops outputting the display image to the display 8, and ends the display of the display image on the display 8 (Step S508).

If the instruction is made to move the virtual viewpoint in the vehicle width direction of the vehicle image (Yes at Step S509), the display image generator 401 changes the height of the virtual viewpoint in conjunction with the movement of the virtual viewpoint in the vehicle width direction of the vehicle image (Step S510). Thereafter, the display image generator 401 performs the processing at Step S504 again to regenerate the display image obtained by viewing the point of gaze in the virtual space from the virtual viewpoint after being moved.

Figure 6:
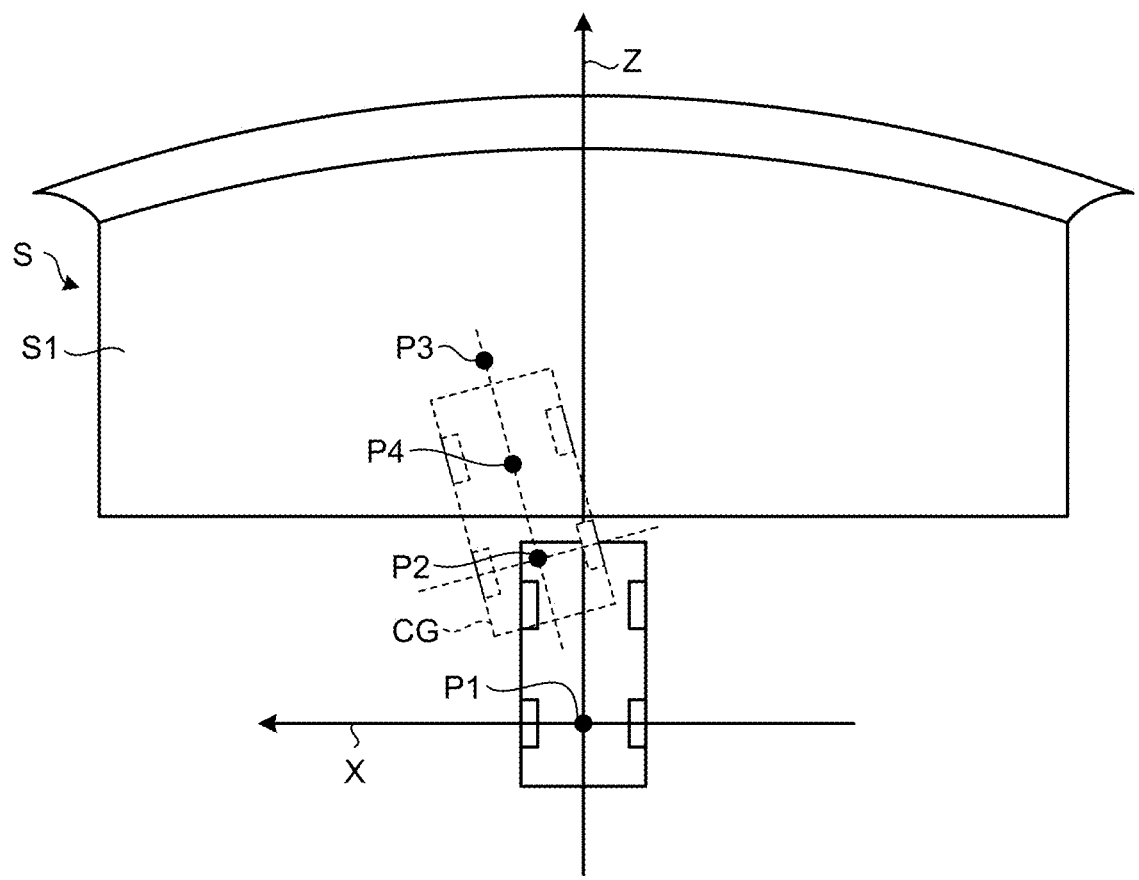
FIG. 6 is a diagram for explaining an example of a camera picture model used for generating the display image by the vehicle according to the first embodiment.
Figure 7:
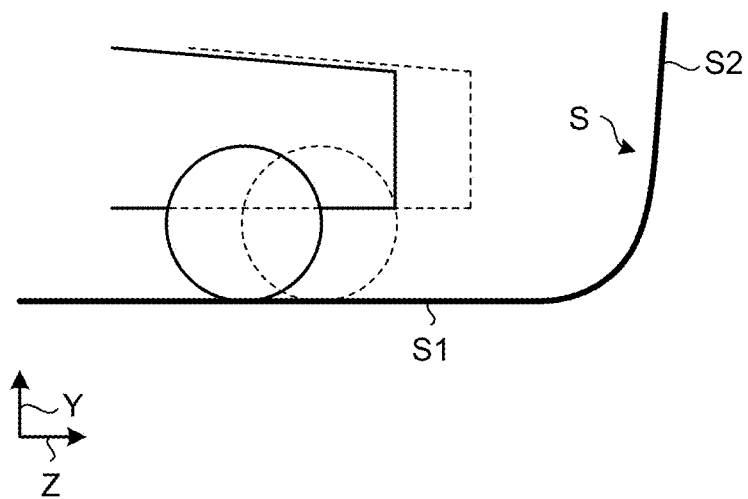
FIG. 7 is a diagram for explaining the example of the camera picture model used for generating the display image by the vehicle according to the first embodiment.
Figure 8:
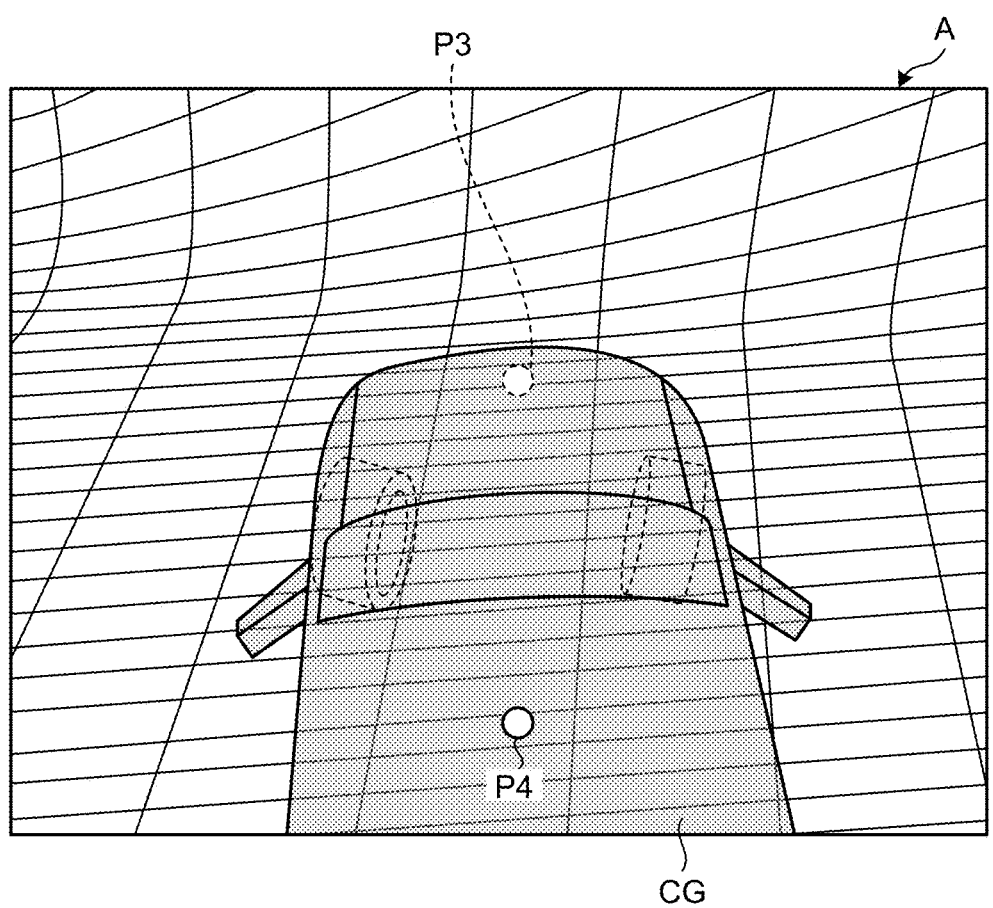
FIG. 8 is a diagram for explaining an example of the camera picture model and a vehicle image used for generating the display image in the vehicle according to the first embodiment.

The following describes generation processing of the display image performed by the vehicle 1 according to the present embodiment, with reference to FIGS. 6 to 8. FIGS. 6 and 7 are diagrams for explaining an example of the camera picture model used for the generation of the display image by the vehicle according to the first embodiment. In FIGS. 6 and 7, a Z-direction denotes a direction parallel to a surface (road surface) of contact of a tire of the vehicle 1; an X-direction denotes a direction parallel to the surface of contact of the tire of the vehicle 1 and orthogonal to the Z-direction; and a Y-direction denotes a direction orthogonal to the surface of contact. FIG. 8 is a diagram for explaining an example of the camera picture model and the vehicle image used for the generation of the display image in the vehicle according to the first embodiment.

In the present embodiment, as illustrated in FIGS. 6 and 7, the display image generator 401 generates in advance a camera picture model S including a first plane S1 and a second plane S2. In the present embodiment, the first plane S1 is a flat plane corresponding to the road surface on which the vehicle 1 is present. For example, the first plane S1 is a flat oval plane. The second plane S2 is a curved plane gradually rising from an outer side (outer edge) of the first plane S1 toward the Y-direction as being away from the first plane S1 with respect to the first plane S1. The second plane S2 is, for example, a curved plane rising from the outer side of the first plane S1 toward the Y-direction in an elliptical shape or a parabolic shape. In other words, the display image generator 401 generates a bowl-shaped or cylindrical three-dimensional plane as the camera picture model S.

In the present embodiment, the display image generator 401 generates a three-dimensional pasting plane including the flat first plane S1 and the curved second plane S2 as the camera picture model S. However, the display image generator 401 is not limited to this example as long as generating a three-dimensional pasting plane as the camera picture model S. For example, the display image generator 401 may generate, as the camera picture model S, a three-dimensional pasting plane including the flat first plane S1 and the second plane S2 that rises from an outer side of the first plane S1 vertically or gradually with respect to the first plane S1.

Then, the display image generator 401 pastes the captured image obtained by imaging the surrounding area of the vehicle 1 using the imaging unit 15 in a past position P1 to the camera picture model S. In the present embodiment, the display image generator 401 creates in advance a coordinate table that associates coordinates (hereinafter, called "three-dimensional coordinates") of points (hereinafter, called "pasting points") in the camera picture model S represented in a world coordinate system having an origin in the past position P1 with coordinates (hereinafter, called "camera picture coordinates") of points (hereinafter, called "camera picture points") in the captured image to be pasted to the pasting points of the three-dimensional coordinates. Then, the display image generator 401 pastes the camera picture points in the captured image to the pasting points of the three-dimensional coordinates associated with the camera picture coordinates of the camera picture points in the coordinate table. In the present embodiment, the display image generator 401 creates the coordinate table each time the internal combustion engine or the electric motor of the vehicle 1 starts.

Then, the display image generator 401 disposes the camera picture model S with the captured image pasted thereto in the space around the vehicle 1. In addition, as illustrated in FIG. 8, the display image generator 401 generates, as a virtual space A, a space in which a vehicle image CG is disposed with respect to a current position P2 of the vehicle 1 in the space in which the camera picture model S is disposed. After generating the virtual space A, the display image generator 401 sets, as a point of gaze P3, a point moved downward from a front end of the vehicle image CG in the virtual space A to the first plane S1 orthogonally thereto, as illustrated in FIG. 6. Then, as illustrated in FIG. 8, the display image generator 401 generates a display image obtained by viewing the point of gaze P3 from a virtual viewpoint P4 received from the operation input unit 10. As a result, the image of the obstacle included in the display image can be viewed simultaneously with the three-dimensional vehicle image CG, so that the positional relation between the vehicle 1 and the obstacle can be easily recognized.

If the display 8 displays, without any modification, an image in the virtual space A including the camera picture model S to which a captured image obtained by imaging the surrounding area of the vehicle 1 (for example, the area in front of the vehicle 1) in the past position P1 using a wide-angle camera (for example, a camera having an angle of view of 180 degrees) is pasted, an image of the vehicle 1 (for example, an image of a front bumper of the vehicle 1) included in the captured image may be included in the display image, giving the passenger of the vehicle 1 an uncomfortable feeling. In contrast, in the present embodiment, the display image generator 401 can prevent the image of the vehicle 1 included in the captured image from being included in the display image, by providing the camera picture model S at a gap from the past position P1 of the vehicle 1 toward the outside of the vehicle 1. Therefore, the passenger of the vehicle 1 can be prevented from feeling discomfort.

Figure 9:
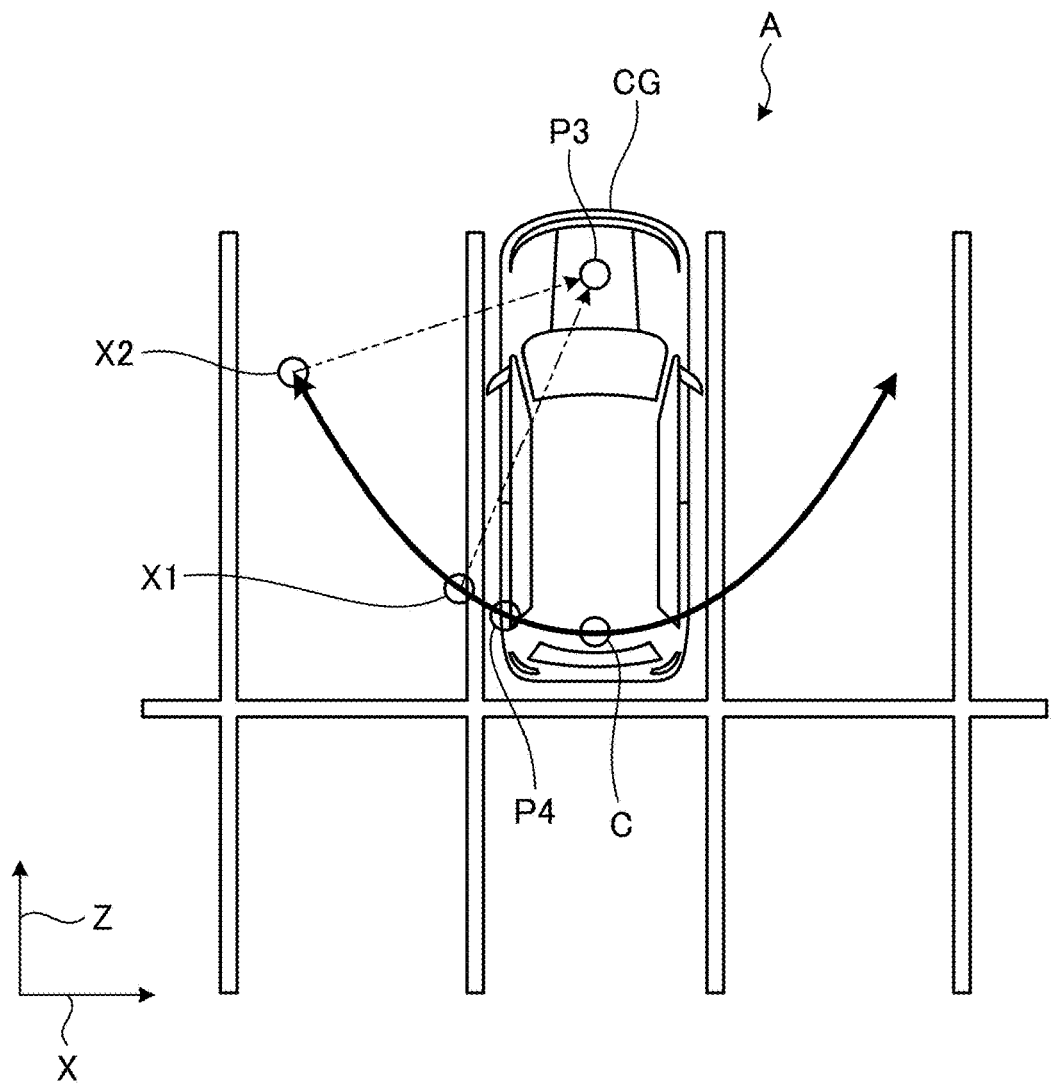
FIG. 9 is a diagram for explaining an example of movement processing of a virtual viewpoint in the vehicle according to the first embodiment.
Figure 10:
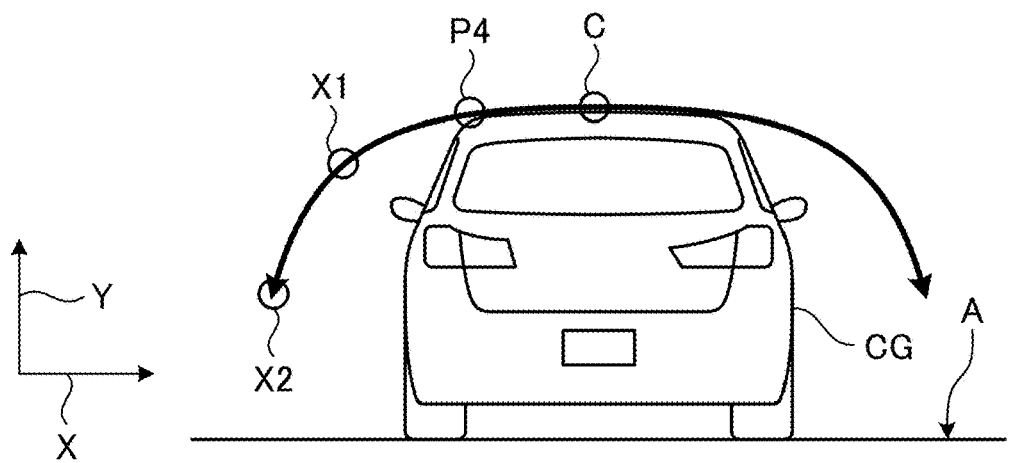
FIG. 10 is a diagram for explaining another example of the movement processing of the virtual viewpoint in the vehicle according to the first embodiment.

The following describes examples of the movement processing of the virtual viewpoint in the vehicle 1 according to the present embodiment, using FIGS. 9 and 10. FIGS. 9 and 10 are diagrams for explaining the examples of the movement processing of the virtual viewpoint in the vehicle according to the first embodiment.

In the present embodiment, if the instruction is made through the operation input unit 10 to move the virtual viewpoint P4 in the vehicle width direction of the vehicle image CG, the display image generator 401 changes the height of the virtual viewpoint P4 in conjunction with the movement of the virtual viewpoint P4 in the vehicle width direction of the vehicle image CG. For example, if the instruction is made to move the virtual viewpoint P4 leftward from a center C of the vehicle image CG in the vehicle width direction of the vehicle image CG, the display image generator 401 moves the virtual viewpoint P4 to a position X1 that is located on the left side of the center C in the vehicle width direction of the vehicle image CG and at a height lower than the height of the virtual viewpoint P4 (above the vehicle image CG) when the virtual viewpoint P4 is located at the center C, as illustrated in FIGS. 9 and 10.

If, thereafter, the instruction is made again to move the virtual viewpoint P4 toward the left side of the center C in the vehicle width direction of the vehicle image CG, the display image generator 401 moves the virtual viewpoint P4 to a position X2 that is located on a further left side of the center C in the vehicle width direction of the vehicle image CG and at a height lower than the height of the position X1, as illustrated in FIGS. 9 and 10. Thus, simply moving the virtual viewpoint P4 in the vehicle width direction of the vehicle image CG can also change the height of the virtual viewpoint P4 so as to display the display image viewed from the viewpoint position desired by the passenger of the vehicle 1. As a result, the display image viewed from the viewpoint position desired by the passenger of the vehicle 1 can be easily displayed.

In the present embodiment, if the instruction is made through the operation input unit 10 to move the virtual viewpoint P4 in the vehicle width direction of the vehicle image CG, the display image generator 401 moves the virtual viewpoint P4 in the front-rear direction of the vehicle image CG in conjunction with the movement of the virtual viewpoint P4 in the vehicle width direction of the vehicle image CG. In the present embodiment, the display image generator 401 moves the virtual viewpoint P4 in the front-rear direction of the vehicle image CG toward a traveling direction of the vehicle image CG as the virtual viewpoint P4 moves away from the center C in the vehicle width direction of the vehicle image CG. For example, as illustrated in FIG. 9, the display image generator 401 moves the virtual viewpoint P4 in a parabolic path as viewed from above the vehicle image CG. This operation can also change the position of the virtual viewpoint P4 in the front-rear direction of the vehicle image CG so as to display the display image in a direction desired to be viewed by the passenger of the vehicle 1, so that the display image can be displayed in a direction closer to the direction desired to be viewed by the passenger of the vehicle 1.

In the present embodiment, the display image generator 401 may determine, according to a traveling condition of the vehicle 1, whether to move the virtual viewpoint P4 in the front-rear direction of the vehicle image CG in conjunction with the movement of the virtual viewpoint P4 in the vehicle width direction of the vehicle image CG. Specifically, if the shift sensor 21 detects that the vehicle 1 travels on an off-road surface based on, for example, a shift of the gear shift operation unit 7 to a low-speed gear position, the display image generator 401 moves the virtual viewpoint P4 toward the traveling direction of the vehicle image CG in the front-rear direction of the vehicle image CG in conjunction with the movement of the virtual viewpoint P4 in the vehicle width direction of the vehicle image CG.

If, in contrast, the shift sensor 21 detects that the vehicle 1 travels on an on-road surface based on, for example, a shift of the gear shift operation unit 7 to a high-speed gear position, the display image generator 401 does not move the virtual viewpoint P4 in the front-rear direction of the vehicle image CG in conjunction with the movement of the virtual viewpoint P4 in the vehicle width direction of the vehicle image CG, or sets an amount of movement of the virtual viewpoint P4 toward the traveling direction of the vehicle image CG in the front-rear direction of the vehicle image CG smaller than that when the vehicle 1 travels on the off-road surface.

In the present embodiment, the display image generator 401 may move the point of gaze P3 in the same direction as the direction of the movement of the virtual viewpoint P4 in the vehicle width direction of the vehicle image CG. This operation can move the point of gaze P3 closer to a position desired to be checked by the passenger of the vehicle 1 in conjunction with the movement of the virtual viewpoint P4, and therefore, can generate an image desired to be checked by the passenger of the vehicle 1 as the display image.

For example, if the instruction is made to move the virtual viewpoint P4 leftward from the center C in the vehicle width direction of the vehicle image CG, the display image generator 401 moves the point of gaze P3 leftward from the center C in the vehicle width direction of the vehicle image CG in conjunction with the movement of the virtual viewpoint P4 leftward from the center C in the vehicle width direction of the vehicle image CG. In the present embodiment, the display image generator 401 moves the point of gaze P3 in the same direction as the direction of the movement of the virtual viewpoint P4 in the vehicle width direction of the vehicle image CG. However, the present invention is not limited to this example. The point of gaze P3 may be moved in a direction opposite to the direction of the movement of the virtual viewpoint P4 in the vehicle width direction of the vehicle image CG.

In the present embodiment, in the case of moving the virtual viewpoint P4, the display image generator 401 sets an amount of movement of the point of gaze P3 in the vehicle width direction of the vehicle image CG smaller than that of the virtual viewpoint P4 in the vehicle width direction of the vehicle image CG. As a result, when the positional relation between the obstacle present near the vehicle 1 and the vehicle 1 is checked, the point of gaze P3 can be prevented from moving by a large amount, so that the obstacle present near the vehicle 1 does not deviate from the view angle of the display image, and the point of gaze P3 can be moved to a position in which the position desired to be viewed by the passenger of the vehicle 1 can be more easily checked.

The following describes examples of the display image generated in the vehicle 1 according to the present embodiment, with reference to FIGS. 11 to 14. FIGS. 11 to 14 are diagrams illustrating the examples of the display image generated in the vehicle according to the first embodiment.

Figure 11:
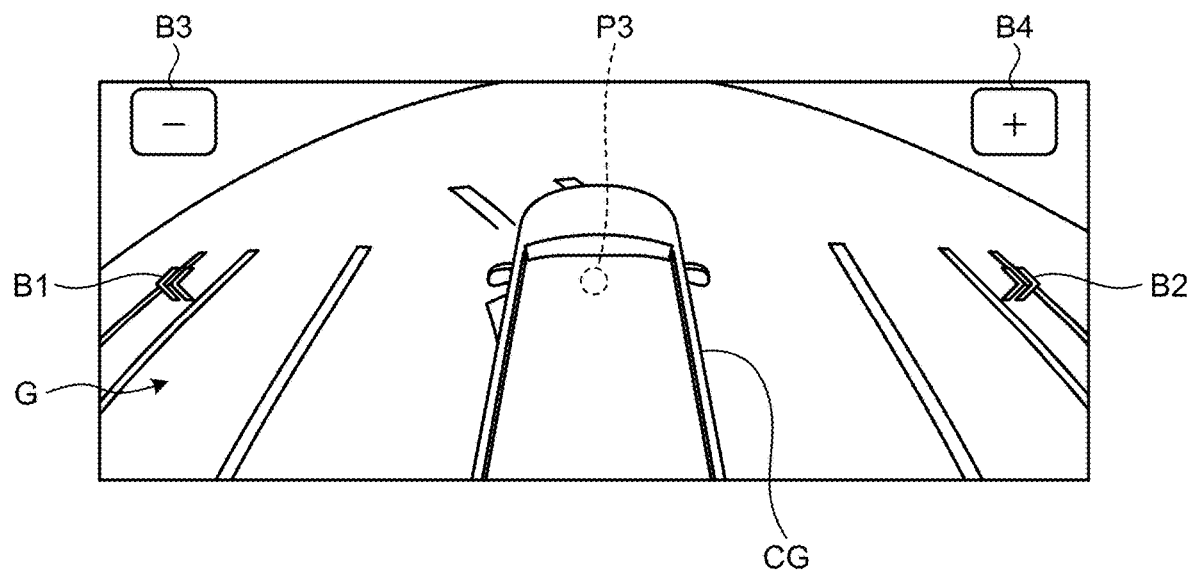
FIG. 11 is a diagram illustrating an example of the display image generated in the vehicle according to the first embodiment.

For example, before the instruction is made to move the virtual viewpoint P4, the display image generator 401 generates a display image G obtained by viewing the point of gaze P3 from the virtual viewpoint P4 present at the center C in the vehicle width direction of the vehicle image CG and above the vehicle image CG, as illustrated in FIG. 11. As illustrated in FIG. 11, the display image generator 401 generates the display image G including a left button B1 capable of instructing to move the virtual viewpoint P4 leftward in the vehicle width direction of the vehicle image CG, a right button B2 capable of instructing to move the virtual viewpoint P4 rightward in the vehicle width direction of the vehicle image CG, a minus button B3 capable of instructing to increase the view angle, and a plus button B4 capable of instructing to reduce the view angle. Since the left button B1 and the right button B2 only need to allow the passenger to imagine the movement of the virtual viewpoint P4, they are not limited to those in FIG. 11 in arrangement, direction, and shape, and may be, for example, obliquely directed or curved.

Figure 12:
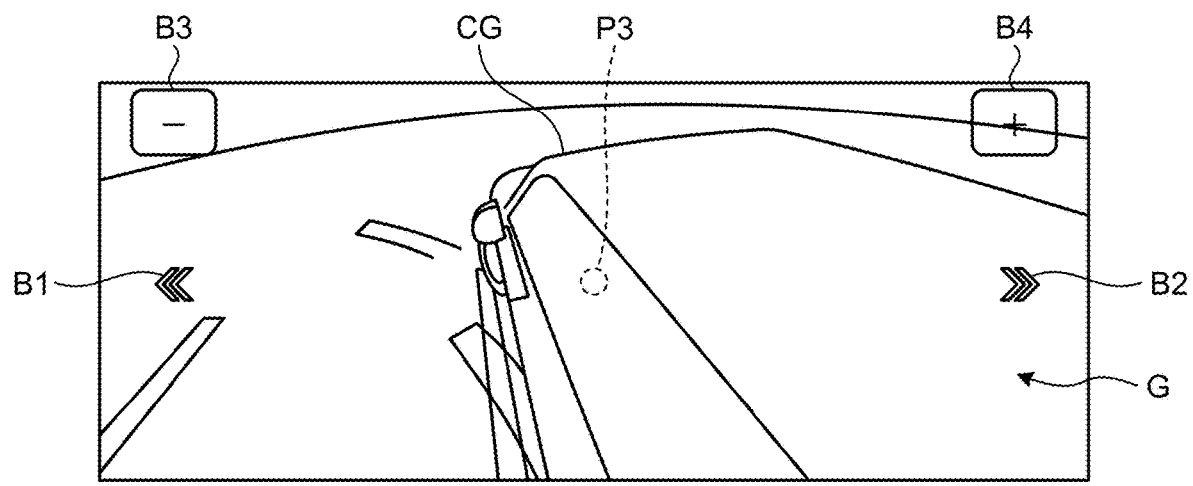
FIG. 12 is a diagram illustrating another example of the display image generated in the vehicle according to the first embodiment.
Figure 13:
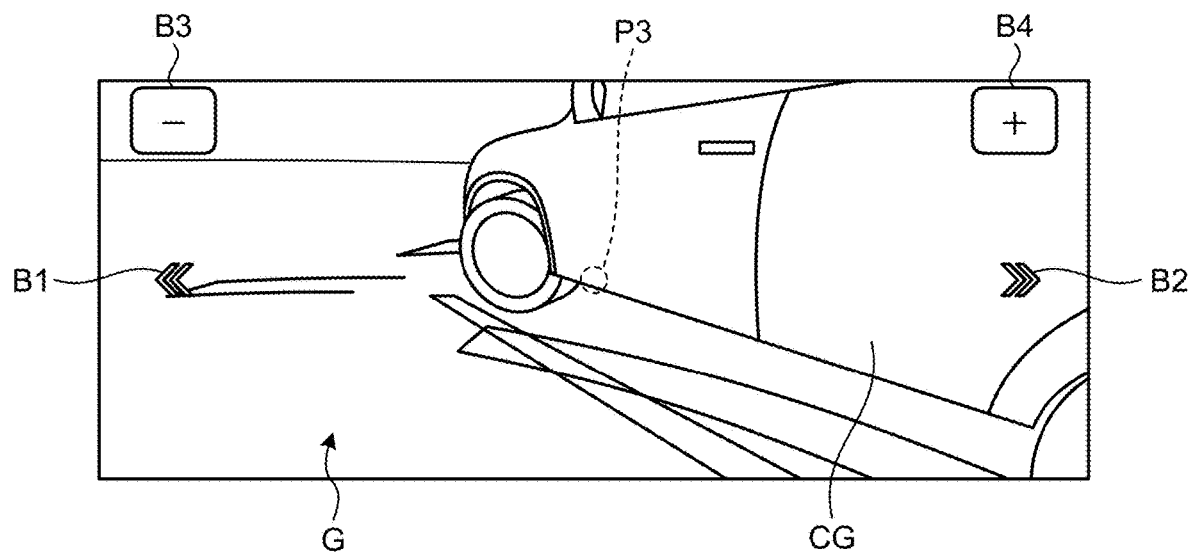
FIG. 13 is a diagram illustrating still another example of the display image generated in the vehicle according to the first embodiment.
Figure 14:
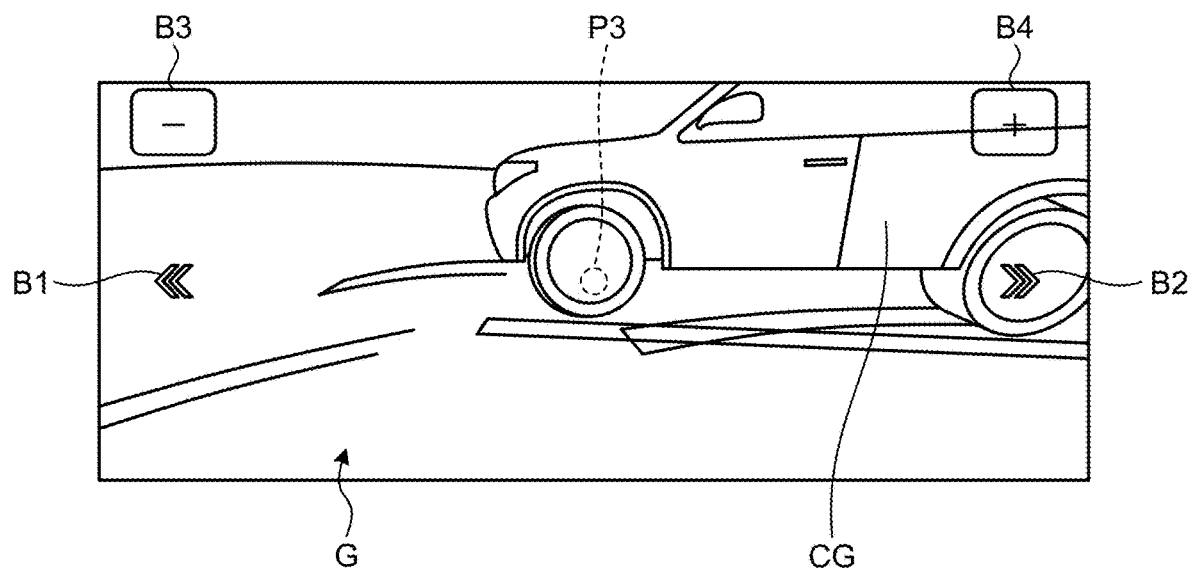
FIG. 14 is a diagram illustrating still another example of the display image generated in the vehicle according to the first embodiment.

If the left button B1 is operated, as illustrated in FIG. 12, the display image generator 401 generates the display image G obtained by viewing the point of gaze P3 from the virtual viewpoint P4 that has moved to the position X1 (refer to FIGS. 9 and 10). If the left button B1 is further operated, as illustrated in FIG. 13, the display image generator 401 generates the display image G obtained by viewing the point of gaze P3 from the virtual viewpoint P4 that has moved to the position X2 (refer to FIGS. 9 and 10). If, thereafter, the left button B1 is operated again, the display image generator 401 moves the virtual viewpoint P4 to a position located on the left side of the position X2 in the vehicle width direction of the vehicle image CG, on a side of the position X2 away therefrom toward the traveling direction of the vehicle image CG in the front-rear direction of the vehicle image CG, and lower by a preset height than the height of the position X2. As illustrated in FIG. 14, the display image generator 401 generates the display image G obtained by viewing the point of gaze P3 from the virtual viewpoint P4 after being moved.

Thus, simply moving the virtual viewpoint P4 in the vehicle width direction of the vehicle image CG can also change the height of the virtual viewpoint P4 so as to further approximate the display image G to an image viewed from a viewpoint position desired by the passenger of the vehicle 1. As a result, the display image G viewed from the viewpoint position desired by the passenger of the vehicle 1 can be easily displayed.

If the minus button B3 is operated, the display image generator 401 increases the view angle of the display image G. If, instead, the plus button B4 is operated, the display image generator 401 reduces the view angle of the display image G. Thus, the passenger of the vehicle 1 can display the display image G on the display 8 at any view angle.

The display image generator 401 may reduce the view angle of the display image G as the virtual viewpoint P4 moves away from the center C in the vehicle width direction of the vehicle image CG. Thus, simply moving the virtual viewpoint P4 in the vehicle width direction of the vehicle image CG can change the view angle so as to further approximate the display image G to an image having a view angle at which the passenger of the vehicle 1 desires to view. As a result, the display image G having the view angle at which the passenger of the vehicle 1 desires to view can be easily displayed. The display image generator 401 can also increase the view angle of the display image G as the virtual viewpoint P4 moves away from the center C in the vehicle width direction of the vehicle image CG.

If an instruction is made by, for example, a sliding operation on the touchscreen panel (an example of the operation input unit 10) to move the virtual viewpoint P4 in a certain direction, the display image generator 401 moves the virtual viewpoint P4 to a position located in a horizontal position corresponding to a horizontal component of the certain direction and at a height corresponding to the horizontal position. The display image generator 401 may include in the display image G, in addition to the left button B1 and the right button B2, a forward button capable of instructing to move the virtual viewpoint P4 in the forward direction of the vehicle image CG and a rearward button capable of instructing to move the virtual viewpoint P4 in the rearward direction of the vehicle image CG, as graphical user interfaces (GUIs) each for indicating the certain direction. In addition, if an instruction is made through the operation input unit 10 to move the virtual viewpoint P4 to a certain position on a preset trajectory in the horizontal direction, the display image generator 401 may change the height of the virtual viewpoint P4 in conjunction with the movement to the certain position.

As described above, since the vehicle 1 according to the first embodiment can also change the height of the virtual viewpoint so as to display the display image viewed from the viewpoint position desired by the passenger of the vehicle 1 by simply moving the virtual viewpoint in the vehicle width direction of the vehicle image, the display image viewed from the viewpoint position desired by the passenger of the vehicle 1 can be easily displayed.

Second Embodiment

A second embodiment of the present invention is an example of matching the position of the virtual viewpoint in the vehicle width direction of the vehicle image with the position of the point of gaze in the vehicle width direction. In the following description, the same configuration as that of the first embodiment will not be described.

Figure 15:
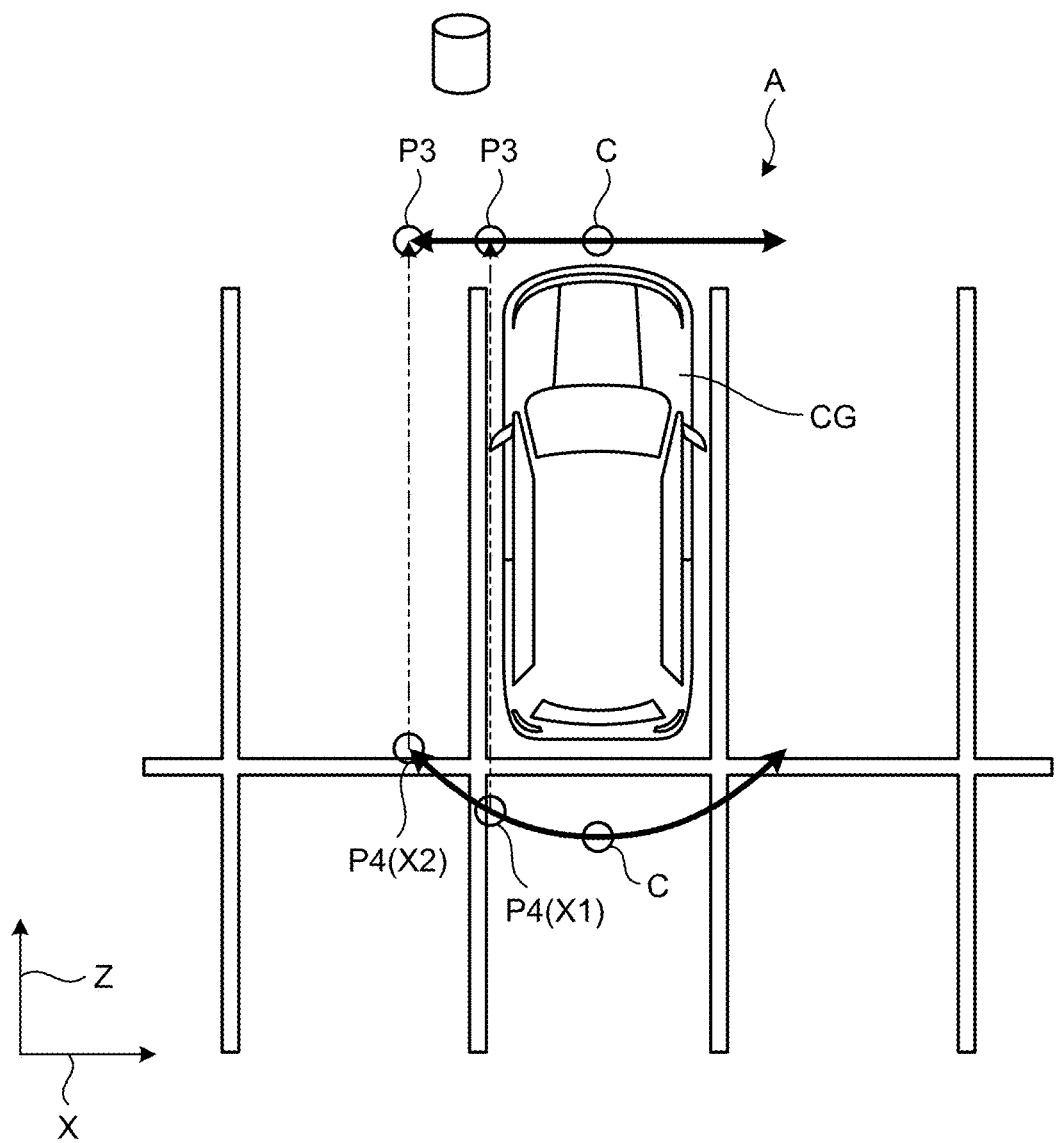
FIG. 15 is a diagram for explaining examples of movement processing of a point of gaze in the vehicle according to a second embodiment of the present invention.

FIG. 15 is a diagram for explaining examples of the movement processing of the point of gaze in the vehicle according to the second embodiment. As illustrated in FIG. 15, if an instruction is made through the operation input unit 10 to move the virtual viewpoint P4 to a position X1 on the left side of the center C in the vehicle width direction of the vehicle image CG, the display image generator 401 moves the virtual viewpoint P4 to the position X1. Accordingly, as illustrated in FIG. 15, the display image generator 401 moves the point of gaze P3 leftward from the center C in the vehicle width direction of the vehicle image CG by the same amount of movement as that of the virtual viewpoint P4 in the vehicle width direction of the vehicle image CG.

As illustrated in FIG. 15, if an instruction is made through the operation input unit 10 to move the virtual viewpoint P4 to a position X2 on the left side of the center C in the vehicle width direction of the vehicle image CG, the display image generator 401 moves the virtual viewpoint P4 to the position X2. Accordingly, as illustrated in FIG. 15, the display image generator 401 moves the point of gaze P3 leftward from the center C in the vehicle width direction of the vehicle image CG by the same amount of movement as that of the virtual viewpoint P4 in the vehicle width direction of the vehicle image CG.

In other words, the display image generator 401 matches the position of the virtual viewpoint P4 with the position of the point of gaze P3 in the vehicle width direction of the vehicle image CG disposed in the virtual space A. As a result, as illustrated in FIG. 15, the positional relation between the vehicle image CG and the obstacle present in front of the vehicle image CG can be easily recognized. Therefore, when the passenger of the vehicle 1 wants to avoid contact of the vehicle 1 with the obstacle present on the lateral side of the vehicle 1 in, for example, a case where the vehicle 1 passes through a narrow passage or approaches a shoulder of a road, the passenger can display the desired display image with a smaller number of operations. A line connecting the point of gaze P3 to the virtual viewpoint P4 can be parallel to the front-rear direction of the vehicle image CG, so that the display image can be displayed that facilitates a determination as to whether the vehicle image CG will contact the obstacle on a side thereof.

In the present embodiment, as illustrated in FIG. 15, the display image generator 401 moves the virtual viewpoint P4 on the opposite side of the traveling direction of the vehicle image CG with respect to an end on the opposite side of the traveling direction of the vehicle image CG among ends in the front-rear direction of the vehicle image CG. However, the present invention is not limited to this example. For example, the display image generator 401 may move the virtual viewpoint P4 on the traveling direction side of the vehicle image CG with respect to the end on the opposite side of the traveling direction of the vehicle image CG among the ends in the front-rear direction of the vehicle image CG.

For example, if the vehicle 1 is detected to travel on the off-road surface, the display image generator 401 moves the virtual viewpoint P4 on the traveling direction side of the vehicle image CG with respect to the end on the opposite side of the traveling direction of the vehicle image CG among the ends in the front-rear direction of the vehicle image CG (refer to FIG. 9). If, instead, the vehicle 1 is detected to travel on the on-road surface, the display image generator 401 moves the virtual viewpoint P4 on the opposite side of the traveling direction of the vehicle image CG with respect to the end on the opposite side of the traveling direction of the vehicle image CG among the ends in the front-rear direction of the vehicle image CG.

Figure 16:
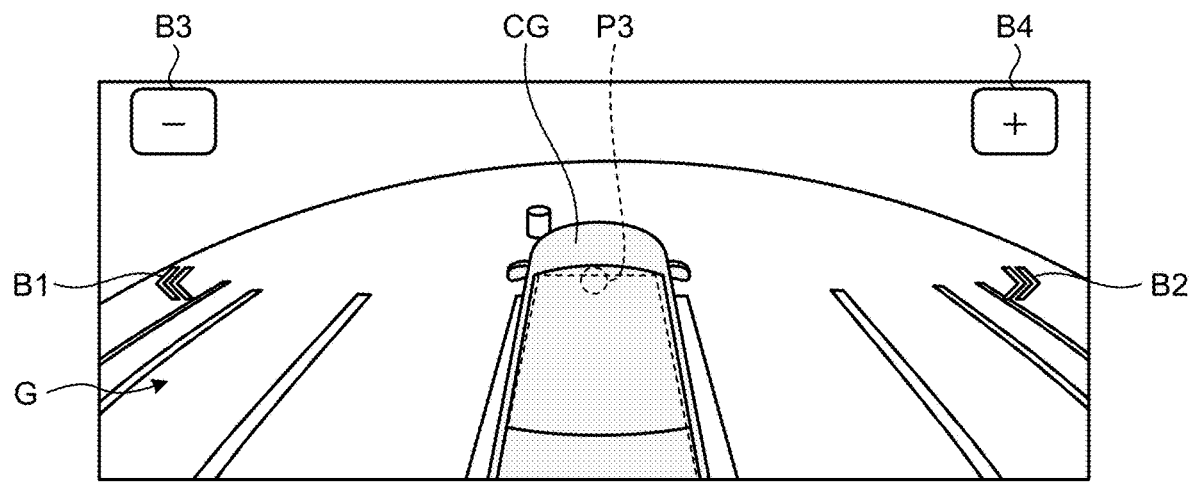
FIG. 16 is a diagram illustrating an example of the display image generated in the vehicle according to the second embodiment.
Figure 17:
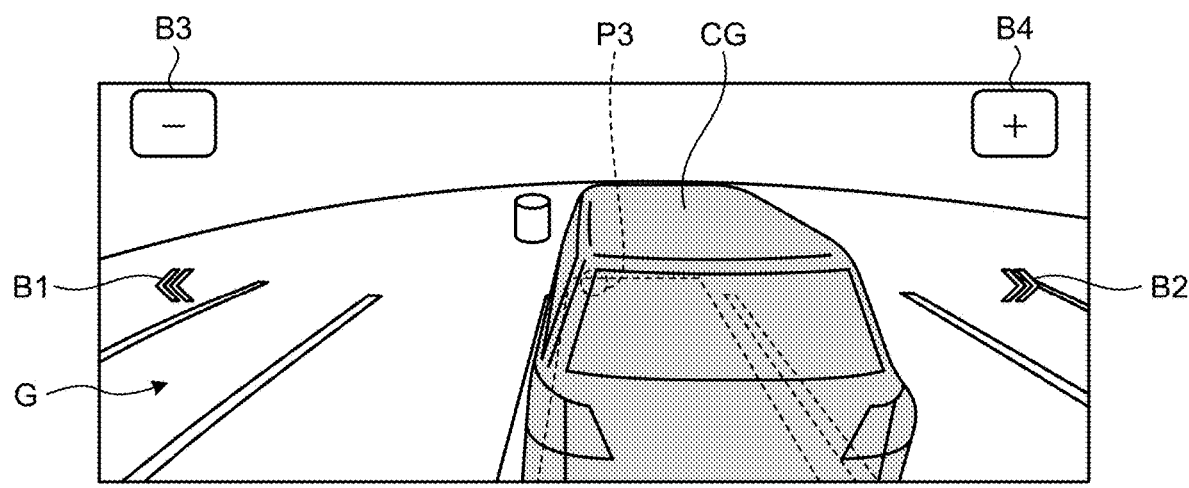
FIG. 17 is a diagram illustrating another example of the display image generated in the vehicle according to the second embodiment.
Figure 18:
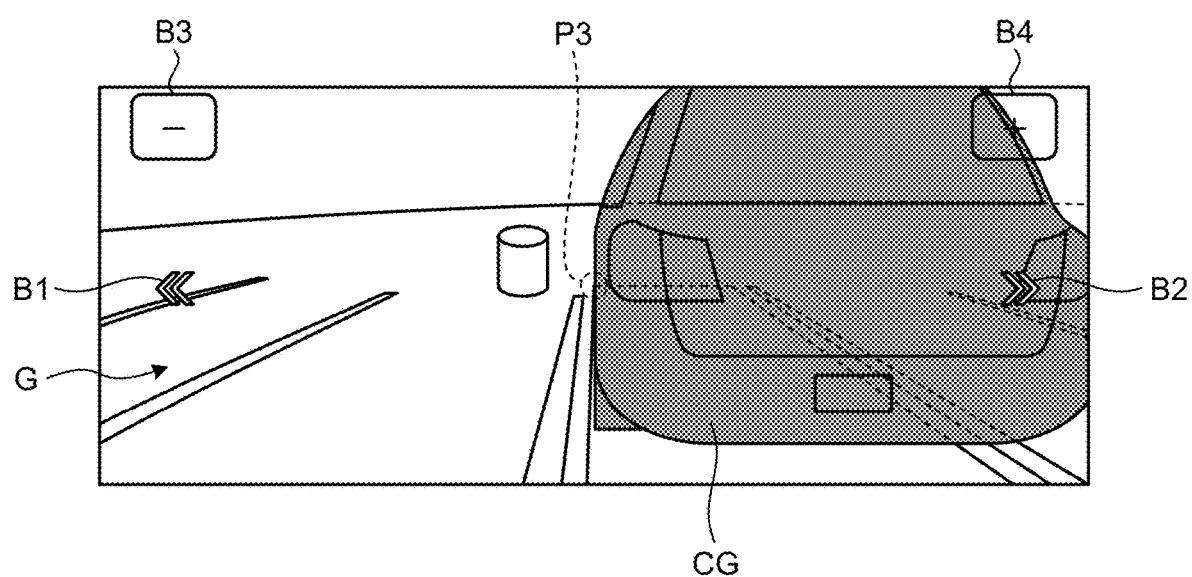
FIG. 18 is a diagram illustrating still another example of the display image generated in the vehicle according to the second embodiment.

FIGS. 16 to 18 are diagrams illustrating examples of the display image generated in the vehicle according to the second embodiment. For example, as illustrated in FIG. 16, before the instruction is made to move the virtual viewpoint P4, the display image generator 401 generates the display image G obtained by viewing the point of gaze P3 from a default position of the virtual viewpoint P4 present at the center in the vehicle width direction of the vehicle image CG and above the vehicle image CG. As a result, if the virtual viewpoint P4 is desired to be moved to a side of the vehicle image CG, the amount of movement of the virtual viewpoint P4 can be smaller, so that the virtual viewpoint P4 can be moved to a desired position in a shorter time.

If the left button B1 is operated, the display image generator 401 moves the virtual viewpoint P4 to a position located on the left side of the default position of the virtual viewpoint P4 in the vehicle width direction of the vehicle image CG and below the default position of the virtual viewpoint P4, and moves the point of gaze P3 to the same position in the vehicle width direction of the vehicle image CG as the virtual viewpoint P4 after being moved. In addition, as illustrated in FIG. 17, the display image generator 401 generates the display image G obtained by viewing the point of gaze P3 after being moved from the virtual viewpoint P4 after being moved.

In the present embodiment, after the left button B1 or the right button B2 starts to be operated until the operation of the button is canceled, the display image generator 401 continues moving the virtual viewpoint P4 in a direction in which the movement in the vehicle width direction of the vehicle image CG is instructed by the operation of the button. Since this configuration eliminates the need for performing the operation to instruct the movement of the virtual viewpoint P4 in the vehicle width direction of the vehicle image CG a plurality of times until the virtual viewpoint P4 moves to the desired position, the simple operation can move the virtual viewpoint P4 to the desired position.

The display image generator 401 changes transmittance of the vehicle image CG according to a change in height of the virtual viewpoint P4. Specifically, as illustrated in FIG. 16, if the height of the virtual viewpoint P4 is a first height (for example, above the vehicle image CG), the display image generator 401 sets the transmittance of the vehicle image CG to first transmittance. In the present embodiment, the first transmittance is transmittance allowing the virtual space to be viewed through the vehicle image CG. As illustrated in FIG. 17, if the height of the virtual viewpoint P4 is a second height (for example, a height of a roof of the vehicle image CG) lower than the first height, the display image generator 401 sets the transmittance of the vehicle image CG to second transmittance. In the present embodiment, the second transmittance is transmittance lower than the first transmittance, and is transmittance allowing the virtual space to be viewed through the vehicle image CG.

Furthermore, as illustrated in FIG. 18, if the height of the virtual viewpoint P4 is a third height (for example, a height lower than the roof of the vehicle image CG) lower than the second height, the display image generator 401 sets the transmittance of the vehicle image CG to third transmittance. In the present embodiment, the third transmittance is transmittance lower than the second transmittance, and is transmittance not allowing the virtual space to be viewed through the vehicle image CG. In other words, the display image generator 401 reduces the transmittance of the vehicle image CG as the height of the virtual viewpoint P4 decreases.

Thus, if the virtual viewpoint P4 has been moved above the vehicle image CG, the virtual viewpoint P4 is highly likely to have been moved in order to look over the vehicle image CG and the surrounding area of the vehicle image CG. Therefore, the transmittance of the vehicle image CG is increased to facilitate to look over the surrounding area of the vehicle image CG through the vehicle image CG. In contrast, if the virtual viewpoint P4 has been moved to a side of the vehicle image CG, the virtual viewpoint P4 is highly likely to have been moved in order to view the positional relation between the vehicle image CG and the obstacle therearound. Therefore, the transmittance of the vehicle image CG is reduced to facilitate viewing the positional relation between the vehicle image CG and the obstacle therearound.

Thus, simply moving the virtual viewpoint P4 in the vehicle width direction of the vehicle image CG can change the transmittance of the vehicle image CG to transmittance facilitating checking information for which the passenger of the vehicle 1 has moved the virtual viewpoint P4. Therefore, the simple operation can display the display image G that facilitates checking the information for which the passenger of the vehicle 1 has moved the virtual viewpoint P4. In the present embodiment, the display image generator 401 reduces the transmittance of the vehicle image CG as the height of the virtual viewpoint P4 decreases. However, the display image generator 401 is not limited thereto, and may increase the transmittance of the vehicle image CG as the height of the virtual viewpoint P4 decreases.

In addition, the display image generator 401 may change the transmittance of the vehicle image CG according to the traveling condition of the vehicle 1. Specifically, if the shift sensor 21 detects that the vehicle 1 travels on the off-road surface based on, for example, the shift of the gear shift operation unit 7 to the low-speed gear position, the display image generator 401 sets the transmittance of the vehicle image CG to the transmittance allowing the virtual space to be viewed through the vehicle image CG. If, in contrast, the shift sensor 21 detects that the vehicle 1 travels on the on-road surface based on, for example, the shift of the gear shift operation unit 7 to the high-speed gear position, the display image generator 401 sets the transmittance of the vehicle image CG to the transmittance not allowing the virtual space to be viewed through the vehicle image CG.

As described above, the vehicle 1 according to the second embodiment facilitates the recognition of the positional relation between the vehicle image and the obstacle present on the lateral side of the vehicle image. Therefore, when the passenger of the vehicle 1 wants to avoid contact of the vehicle 1 with the obstacle present on the lateral side of the vehicle 1 in, for example, the case where the vehicle 1 passes through the narrow passage or approaches the shoulder of the road, the passenger can display the desired display image with the smaller number of operations.

The invention claimed is:

1. A periphery monitoring device comprising:
a processor configured to:
generate a display image obtained by viewing, from a virtual viewpoint, a point of gaze in a virtual space including a model obtained by pasting a captured image obtained by imaging a surrounding area of a vehicle using an imaging unit provided on the vehicle to a three-dimensional plane around the vehicle, and including a three-dimensional vehicle image; and
output the display image to a display, wherein
the processor changes a height of the virtual viewpoint in conjunction with a directional component in a vehicle width direction of the vehicle image when an instruction is made through an operation input unit to move the virtual viewpoint,
wherein the processor moves a position of the virtual viewpoint in a front-rear direction of the vehicle image in a traveling direction of the vehicle image as the virtual viewpoint moves away from a center in a vehicle width direction of the vehicle image.

2. The periphery monitoring device according to claim 1, wherein the processor reduces the height of the virtual viewpoint as the virtual viewpoint moves away from a center in a vehicle width direction of the vehicle image.

3. The periphery monitoring device according to claim 1, wherein the processor reduces a view angle of the display image as the virtual viewpoint moves away from a center in a vehicle width direction of the vehicle image.

4. The periphery monitoring device according to claim 1, wherein the processor matches a position of the virtual viewpoint in a vehicle width direction of the vehicle image with a position of the point of gaze in the vehicle width direction of the vehicle image.

5. A periphery monitoring device comprising:
a processor configured to:
generate a display image obtained by viewing, from a virtual viewpoint, a point of gaze in a virtual space including a model obtained by pasting a captured image obtained by imaging a surrounding area of a vehicle using an imaging unit provided on the vehicle to a three-dimensional plane around the vehicle, and including a three-dimensional vehicle image; and
output the display image to a display, wherein
the processor changes a height of the virtual viewpoint in conjunction with a directional component in a vehicle width direction of the vehicle image when an instruction is made through an operation input unit to move the virtual viewpoint,
wherein the processor sets transmittance of the vehicle image to first transmittance when the height of the virtual viewpoint is a first height, and sets the transmittance of the vehicle image to second transmittance lower than the first transmittance when the height of the virtual viewpoint is a second height lower than the first height.

6. The periphery monitoring device according to claim 5, wherein the processor reduces the height of the virtual viewpoint as the virtual viewpoint moves away from a center in a vehicle width direction of the vehicle image.

7. The periphery monitoring device according to claim 5, wherein the processor reduces a view angle of the display image as the virtual viewpoint moves away from a center in a vehicle width direction of the vehicle image.

8. The periphery monitoring device according to claim 5, wherein the processor matches a position of the virtual viewpoint in a vehicle width direction of the vehicle image with a position of the point of gaze in the vehicle width direction of the vehicle image.

* * * * *